United States Patent
Maille et al.

(10) Patent No.: US 7,403,880 B2
(45) Date of Patent: Jul. 22, 2008

(54) MOVING A VIRTUAL ARTICULATED OBJECT IN A VIRTUAL ENVIRONMENT WHILE AVOIDING INTERNAL COLLISIONS BETWEEN THE ARTICULATED ELEMENTS OF THE ARTICULATED OBJECT

(75) Inventors: Bruno Maille, Paris (FR); Edouard Ramstein, Melun (FR); Patrick Chedmail, La Chapelle sur Erdre (FR)

(73) Assignee: SNECMA, Paris (FR)

( * ) Notice: Subject to any disclaimer, the term of this patent is extended or adjusted under 35 U.S.C. 154(b) by 601 days.

(21) Appl. No.: 10/970,161

(22) Filed: Oct. 22, 2004

(65) Prior Publication Data
US 2005/0096890 A1 May 5, 2005

(30) Foreign Application Priority Data
Oct. 29, 2003 (FR) .................................. 03 12640

(51) Int. Cl.
*G06F 17/10* (2006.01)
*G05B 19/18* (2006.01)

(52) U.S. Cl. ............................ 703/2; 700/255; 700/262

(58) Field of Classification Search ................. 703/1, 703/2; 345/473; 294/106; 700/245, 255, 700/262
See application file for complete search history.

(56) References Cited

U.S. PATENT DOCUMENTS 5,625,577 A * 4/1997 Kunii et al. .................. 703/2

(Continued)

FOREIGN PATENT DOCUMENTS

EP 1 046 470 A2 10/2000

(Continued)

OTHER PUBLICATIONS

Duffy et al., N. Real-time collision avoidance system for multiple robots operating in shared work-space, IEE Proceedings, Computers and Digital Techniques, vol. 138, Nov. 1989, pp. 478-084.*

(Continued)

*Primary Examiner*—Russell Frejd
(74) *Attorney, Agent, or Firm*—Oblon, Spivak, McClelland, Maier & Neustadt, P.C.

(57) ABSTRACT

A method of moving a virtual articulated object in a virtual environment in a succession of unit movements, the articulated object including a set of articulated elements connected together by a set of joints, the relative positions of the articulated elements being defined by a plurality of joint angles about a plurality of degrees of freedom. The method includes the steps of calculating an interaction distance between a given articulated element and the other articulated elements of the articulated object; extracting from the interaction distance, a first point belonging to the given articulated element, and a second point belonging to one of the other articulated elements of the articulated object; and defining a single extraction vector from the first and second points. The method further includes a step of moving the given articulated element away from the other articulated elements of the articulated object in a movement defined as a function of the single extraction vector by acting on the degrees of freedom of the articulated object in order to avoid a collision between the given articulated element and the other elements of the articulated object.

19 Claims, 4 Drawing Sheets

U.S. PATENT DOCUMENTS

| | | | |
|---|---|---|---|
| 6,853,964 B1* | 2/2005 | Rockwood et al. | 703/2 |
| 7,024,279 B2* | 4/2006 | Rose et al. | 700/245 |
| 7,168,748 B2* | 1/2007 | Townsend et al. | 294/106 |
| 2004/0169656 A1* | 9/2004 | Piponi et al. | 345/473 |
| 2004/0236541 A1* | 11/2004 | Kramer et al. | 703/1 |

FOREIGN PATENT DOCUMENTS

WO     WO 97/40471     10/1997

OTHER PUBLICATIONS

Lu et al., L. Folding Cartons with Fixtures: A Motion Planning Approach, Proceedings of the 1999 IEEE International Conference on Robotics & Automation, vol. 2, May 1999, pp. 1570-1576.*

Chang et al., C. Collision Avoidance of Two General Robot Manipulators by Minimum Delay Time, IEEE Transactions on Systems, man, and Cybernetics, vol. 24, No. 3, Mar. 1994, pp. 517-522.*

Yakey et al., J.H. Randomized Path Planning for Linkages With Closed Kinematic Chains, IEEE Transactions on Robotics and Automation, vol. 17, No. 6, Dec. 2001, pp. 951-958.*

Lu et al., L. Folding Cartons with Fixtures: A Motion Planning Approach, IEEE Transactions on Robotics and Automation, vol. 16, No. 4, Aug. 2000, pp. 346-356.*

Chablat et al., D. Architecture Optimization of a 3-DOF Translational Parallel Mechanism for Machining Applications, the Orthoglide, IEEE Transactions on Robotics and Automation, vol. 19, No. 3, Jun. 2003, pp. 403-410.*

Anderson, R.J. Using Virtual Objects to Aid Underground Storage Tank Teleoperation, 1994 International Conference on Robotics and Automation, IEEE, May 1994, pp. 1421-1426.*

James Kuffner, et al., "Self-Collision Detection and Prevention for Humanoid Robots", XP-002293107, In Proc. IEEE Int'l Conf. on Robotics and Automation (ICRA 2002), May 2002, pp. 1-6.

S. J. Kwon, et al., "Sef-Collision Avoidance for n-Link Redundant Manipulators", Decision Aiding for Complex Systems, Proceedings of the International Conference on Systems, Man and Cybernetics, IEEE, vol. 1, Oct. 13, 1991, XP010054847, pp. 937-942.

J. Tornero, et al., "Spherical-Object Representation and Fast Distance Computation for Robotic Applications", Proceedings of the International Conference on Robotics and Automation, IEEE, Apr. 9-11, 1991, pp. 1602-1608.

* cited by examiner

MOVING A VIRTUAL ARTICULATED OBJECT IN A VIRTUAL ENVIRONMENT WHILE AVOIDING INTERNAL COLLISIONS BETWEEN THE ARTICULATED ELEMENTS OF THE ARTICULATED OBJECT

FIELD OF THE INVENTION

The present invention relates to the field of simulating movement of a virtual articulated object in a virtual environment. In particular, the invention relates to avoiding collisions between the articulated elements of the articulated object and the remainder of the articulated object.

BACKGROUND OF THE INVENTION

In numerous industries, such as the aviation or space industries, it is common practice to use models in virtual reality. For example, a digital mock-up is often used to evaluate interference between various parts.

Similarly, modeling can be used to simulate human or robot actions in a defined environment in order to visualize the movement that a technician or a robot will need to make in order to undertake those actions, for example. This is useful for validating and optimizing accessibility to certain parts of a machine, such as the parts in an airplane engine, which parts require regular inspection and maintenance.

Thus, ease of access to the various elements of a device can be checked virtually as soon as the elements have been modeled, by means of a simulation using a virtual articulated object.

A virtual articulated object is a digital data set defining a dynamic system characterized by a plurality of elements that are articulated with a plurality of degrees of freedom.

Thus, at a given instant, the virtual articulated object may be defined by its position and orientation in a three-dimensional space and by values for the degrees of freedom of its joints. The data and the parameters defining the environment of the virtual articulated object can be stored in a digital data medium.

The use of a virtual articulated object for this type of application already exists.

An example is given in the article by Chedmail, Damay, and Le Roy, entitled "Réalité virtuelle, maquette numérique du produit, outils de distribution et partage de la conception" [Virtual reality, digital mock-up of the product, tools for distributing and sharing designs] (Journées Priméca, La Plagne, Apr. 7-9, 1999).

That article proposes a method of validating accessibility for assembling and disassembling an object in an obstructed environment using a model for the movement of two virtual articulated arms or of a virtual dummy in a virtual environment.

That method enables the dummy to move in an environment obstructed by obstacles without coming into collision with the obstacles.

However, the posture of the dummy, as it moves, can be arbitrary and that can lead to a collision between a given member of the dummy and the other members of the dummy. That reduces the accuracy with which movement of the dummy is modeled.

OBJECT AND SUMMARY OF THE INVENTION

The present invention seeks to remedy the above-mentioned drawbacks by providing a method that enables the movement or the manipulation of an articulated object to be simulated while avoiding collision between a given articulated element and the other articulated elements of the articulated object, and to do so with optimized calculation time.

Another object is to avoid internal collisions between all of the articulated elements of the articulated object by causing the various articulated elements to avoid one another.

These objects are achieved by a method of moving a virtual articulated object in a virtual environment in a succession of unit movements, the articulated object comprising a set of articulated elements connected together by a set of joints, the relative positions of the articulated elements being defined by a plurality of joint angles about a plurality of degrees of freedom, the method comprising the following steps:

calculating an interaction distance between a given articulated element and the other articulated elements of the articulated object;

extracting from said interaction distance, a first point belonging to the given articulated element, and a second point belonging to one of the other articulated elements of the articulated object;

defining a single extraction vector from said first and second points; and moving the given articulated element away from the other articulated elements of the articulated object in a movement defined as a function of the single extraction vector by acting on the degrees of freedom of the articulated object in order to avoid a collision between the given articulated element and the other elements of the articulated object.

Thus, the method of the invention avoids collision between a given articulated element of the articulated object and the other articulated elements of the articulated object by using a single calculation of an interaction distance.

This makes it possible to model the movement of the articulated object with great accuracy and with optimized calculation time.

Advantageously, said steps of calculating an interaction distance, extracting the first and second points, defining the extraction vector, and moving away the given articulated element, are repeated for each of the articulated elements of the articulated object in order to avoid collision between each articulated element and the remainder of the articulated object.

The various articulated elements thus avoid one another without internal collisions.

The method of the invention further comprises a step after each unit movement in said succession of unit movements of determining whether a collision has occurred between the given articulated element and the other articulated elements of the articulated object.

In a first embodiment of the invention, the interaction distance corresponds to a penetration depth, such that the extraction vector is equal to the coordinates of the second point minus the coordinates of the first point, the penetration depth enabling the articulated object to move with a limited and controlled amount of collision between its articulated elements.

In a second embodiment of the invention, the interaction distance corresponds to a minimum distance, such that the extraction vector is equal to the coordinates of the first point minus the coordinates of the second point, the minimum distance enabling the articulated object to move without collision between its articulated elements.

The method further comprises a step of canceling the most recent unit movement in said succession of unit movements in the event of a collision occurring between the given articulated element and the other articulated elements of the articulated object.

Advantageously, said steps of extracting the first and second points, of defining the extraction vector, and of moving away the given articulated element, are not executed so long as a collision does not occur between the given articulated element and the other articulated elements of the articulated object.

The given articulated element may be moved away from the other articulated elements of the articulated object by joint-flexing movement acting on each of the joints belonging to a chain of joints preceding the given articulated element, with the joint-flexing movement acting at any given joint in said chain of joints comprising the following steps:

- defining a first vector between the articulation center of said given joint and the origin of the extraction vector;
- defining a second vector between the articulation center of said given joint and the end of the extraction vector;
- calculating an angle of rotation for causing the first vector to coincide with the second vector;
- calculating one or more individual joint flexing angles by resolving said angle of rotation on the axis or axes defining the degree or degrees of freedom corresponding to said given joint; and
- turning the articulated element about said given joint through one or more angles proportional to said individual joint angle(s).

The angle of rotation may be calculated by means of a vector product between the first and second vectors.

The individual joint angle(s) may be calculated by means of one or more scalar products between the vector product and the axis or axes of the degree(s) of freedom of the given joint.

In a particular implementation of the invention, the articulated element may be moved away from the other articulated elements of the articulated object by means of an internal avoider agent acting on the plurality of degrees of freedom of the articulated object.

Advantageously, the articulated object is specified in its virtual environment by a global position, and a global orientation, such that the articulated object is moved by means of an attractor agent acting on a global position, and/or a global orientation, and/or the plurality of degrees of freedom of the articulated object.

The method may further include a step of an operator moving the articulated object in real time by means of an operator agent acting on the position and/or the orientation and/or the plurality of degrees of freedom of the articulated object.

According to a feature of the invention, the articulated object is a virtual dummy moving on a floor of a virtual environment, the dummy being defined by a position on the virtual floor, by an orientation about a vertical axis perpendicular to said floor and passing through the center of gravity of the dummy, and by the plurality of joint angles defining the set of articulated elements.

The invention also provides a computer program designed to implement the above-described method, when executed by a computer.

BRIEF DESCRIPTION OF THE DRAWINGS

Other features and advantages of the method and the system of the invention will appear more clearly on reading the following description given by way of non-limiting indication and with reference to the accompanying drawings, in which.

DETAILED DESCRIPTION OF PREFERRED IMPLEMENTATIONS

Figure 1:
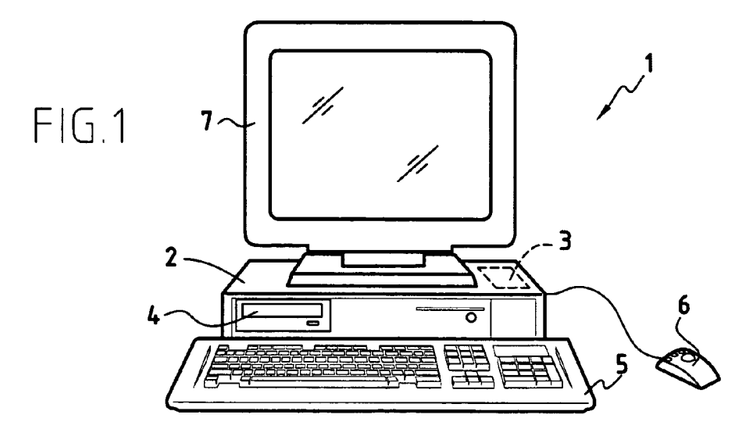
FIG. 1 is a perspective view of hardware means implemented in the system or method of the invention.

FIG. 1 shows a system which can be used for modeling the movement of an articulated object. The system comprises a workstation or computer 1 having good graphics capacity, used for executing a computer program designed to implement the method of the invention.

The computer 1 comprises the hardware means that are usually found in this type of apparatus. More particularly, the computer comprises a central unit 2 which executes the sequences of instructions in the program for implementing the method of the invention, a central memory 3 which stores the data and the programs that are being executed, digital data storage media (hard disk, CD 4, floppy disk, . . . ) for long-term storage of the data and the programs used, input peripherals (keyboard 5, 2D or 3D mouse 6, joystick, . . . ) and output peripherals (screen 7, stereoscopic headsets or glasses, . . . ) in order to be able to view the movement of an articulated object.

Naturally, in order to increase calculation capacity, the modeling of the invention may be implemented on a plurality of workstations operating in parallel.

Figure 2A:
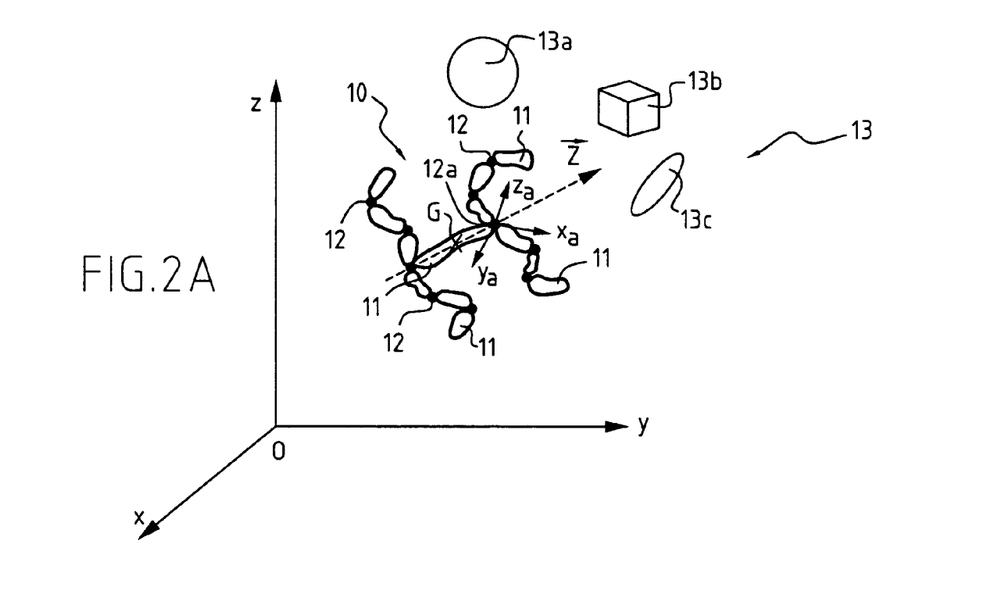
FIG. 2A is highly diagrammatic and shows a virtual articulated object comprising a set of articulated elements in accordance with the invention.

FIG. 2A is highly diagrammatic and shows a virtual articulated object 10 comprising a set of articulated elements 11 interconnected by a set of joints 12.

In addition, the articulated object 10 is characterized by a tree structure of joints such that the articulated elements 11 and the joints 12 can be classified in conventional manner in a plurality of chains of joints.

Each joint 12 may have a plurality of axes defining a plurality of degrees of freedom for the joint, thus enabling the internal state of the articulated object 10 to be determined by a plurality of degrees of freedom. By way of example, FIG. 2A shows a joint 12a having three axes defining three degrees of freedom associated with said joint 12a.

The relative positions of the articulated elements 10 can thus be defined at any instant by a plurality of joint angles about the plurality of degrees of freedom of the articulated object 10.

In addition, a local frame of reference whose origin is at the center of gravity G of the articulated object 10 can be associated therewith.

In particular, the local frame of reference may comprise a single axis $\vec{Z}$ passing through the center of gravity G of the articulated object 10.

The articulated object 10 can move in a virtual environment 13 which may be obstructed by various objects or obstacles 13a, 13b, and 13c, and in conventional manner the articulated object 10 can avoid coming into collision with them as it moves.

Thus, the articulated object 10 and its environment can be defined in a three-dimensional space (O; x, y, z) relative to which the position and the orientation of the articulated object 10 and also of the various objects 13a, 13b, and 13c in its environment 13 can be specified in simple manner.

Consequently, in addition to the relative positions of the set of articulated elements 11, the articulated object 10 can also be specified at all times in its environment 13 by a global position and a global orientation.

The global position of the articulated object 10 can be defined by Cartesian coordinates along the axes x, y, and z for its center of gravity G.

Its global orientation can be specified in known manner by three angles defining the orientation of the axis $\vec{Z}$ associated with the articulated object relative to the axes x, y, and z.

Naturally, it is also necessary to take account of the parameters or constraints that are imposed by the limits on the joints and by the physical connections between the various members or elements 11 of the articulated object 10.

These data and variables defining the articulated object 10 and the parameters defining its environment 13 are stored in the digital data medium 3 of the computer system 1.

Figure 2B:
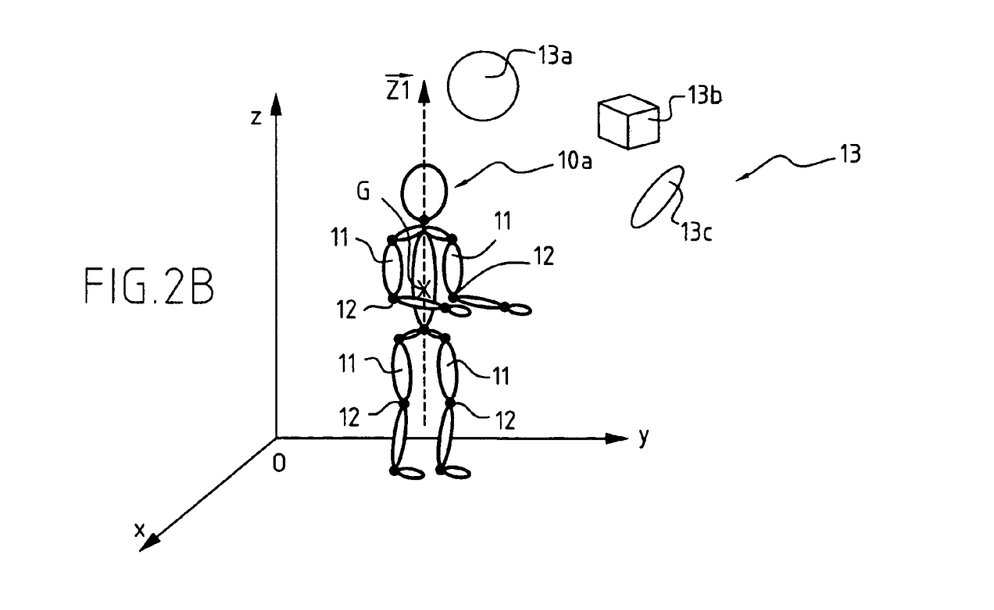
FIG. 2B is a variant of FIG. 2A.

FIG. 2B shows that the articulated object may be constituted in particular by a virtual dummy 10a moving on the floor of the virtual environment 13.

Under such circumstances, the dummy 10a may be defined by a plurality of joint angles defining all of its articulated elements, its position on the virtual floor, and its orientation about a virtual axis $\vec{Z1}$ perpendicular to said floor and passing through the center of gravity G of the dummy 10a.

In conventional manner, the articulated object 10 such as the dummy 10a can be moved in the virtual environment 13 in a succession of unit movements, e.g. in order to reach a target 13c.

Thus, in order to generate a trajectory enabling the articulated object 10 to reach its target 13c, it is possible to act on the global position of the articulated object 10 using a predefined step size for moving its position, and/or on the global orientation of the articulated object using a predefined step size for changing orientation, and/or the plurality of degrees of freedom of the articulated object using a predefined step size for joint movement Δa.

In order to avoid internal collisions between a given articulated element and the other articulated elements 11 of the articulated object 10, it is necessary to define a collision criterion.

In known manner, a criterion for collision between any two objects can be defined by calculating an interaction distance between the two objects. This collision criterion can also provide the points that materialize this interaction distance.

It should be observed that the interaction distance may correspond to a minimum distance or to a penetration depth between the two objects.

Figure 3A:
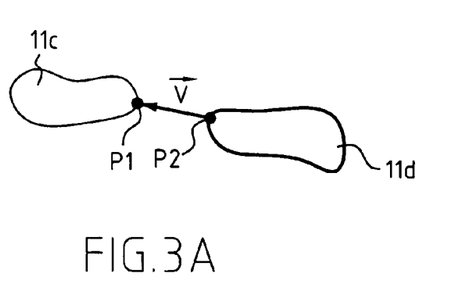
FIG. 3A is highly diagrammatic and shows an extraction vector defined in a minimum distance mode of the invention.
Figure 3B:
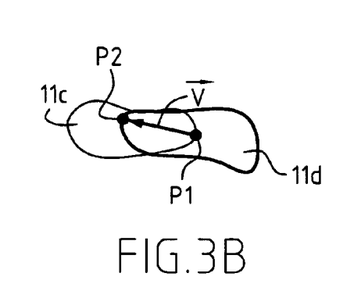
FIG. 3B is highly diagrammatic and shows an extraction vector defined in a penetration depth mode of the invention.

FIGS. 3A and 3B show how the interaction distance between a given articulated element 11c of the articulated object 10 and one of the other articulated elements 11d of the articulated object 10 is recognized.

The example of FIG. 3A shows more particularly the minimum distance criterion between the given articulated element 11c and one of the other articulated elements 11d of the articulated object 10, and also the points P1 and P2 that materialize this minimum distance.

In addition, the example of FIG. 3B shows the penetration depth criterion between the given articulated element 11c and one of the other articulated elements 11d of the articulated object 10, together with the points P1 and P2 materializing this penetration depth.

Thus, calculating the interaction distance makes it possible to extract a point P1 referred to as the "first point" in the description below belonging to the given articulated element 11c of the articulated object 10, and another point P2, referred to as the "second point" in the description below belonging to one of the other articulated elements 11d of the articulated object 10.

From these first and second points P1 and P2 it is then possible to define a single extraction vector $\vec{V}$.

In the mode based on calculating a minimum distance (FIG. 3A), the extraction vector $\vec{V}$ is equal to the coordinates of the first point P1 minus the coordinates of the second point P2. In other words, the second point P2 is the origin of the extraction vector $\vec{V}$ and the first point P1 is the end of the extraction vector $\vec{V}$.

In contrast, in the mode based on calculating a penetration depth (FIG. 3B), the extraction vector $\vec{V}$ is equal to the coordinates of the second point P2 minus the coordinates of the first point P1. In other words, the first point P1 is the origin of the extraction vector $\vec{V}$ and the second point P2 is the end of the extraction vector $\vec{V}$.

Finally, in order to avoid a collision between the given articulated element 11c and the other articulated elements 11 of the articulated object 10, the given articulated element 11c may be moved away from the other articulated elements 11 following a movement that is defined as a function of the single extraction vector $\vec{V}$ and acting on the degrees of freedom of the articulated object 10.

Figure 4:
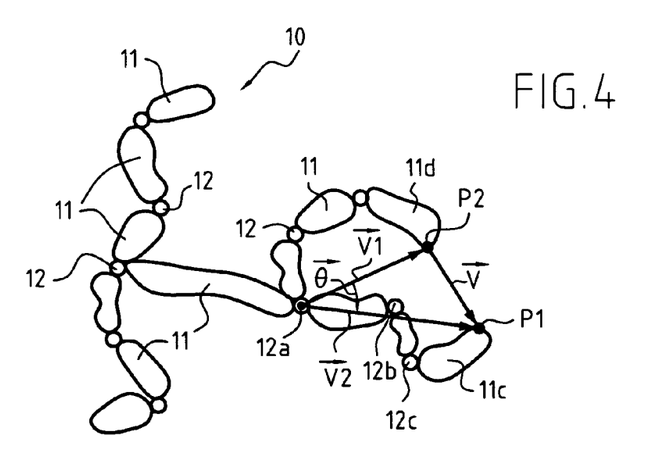
FIG. 4 is highly diagrammatic and shows a separation movement acting on a given joint of the articulated object of the invention.

FIG. 4 shows a separation movement whereby the given articulated element 11c moves away from the other articulated elements 11 of the articulated object 10 using the minimum distance mode, but it will naturally be understood that the principle is the same when using the penetration depth mode.

This separation movement is a movement in rotation amounting to flexing a joint of the articulated object 10 depending on its degrees of freedom.

It should be observed that the given articulated element 11c is moved away from the other articulated elements 11 of the articulated object 10 by movement in rotation at each of the joints 12 forming part of the chain of joints preceding the element 11c of the articulated object 10 to which the above-defined first point P1 belongs. In this example, the second point P2 belongs to one of the other articulated elements, i.e. the elements referenced 11d.

By way of example, if the articulated object is a virtual dummy 10a and if the interaction distance between the given articulated element 11c and the other articulated elements 11 of the articulated object 10 is materialized by a first point P1 on the forearm, then the chain of joints corresponds to the elbow, the shoulder, and the clavicle. In other words, the rotary movement of joints is calculated so as to act on all of the joints 12 of the arm and preceding the forearm. Otherwise, if the first point P1 belongs to the upper arm, then the chain of joints would comprise only the shoulder and clavicle joints. If the first point P1 belongs to the hand, then all of the joints 12 of the arm should be taken into consideration, i.e. the chain of joints would comprise the wrist, the elbow, the shoulder, and the clavicle.

Thus, for a given articulated object 10, the chain of joints depends on which articulated element of the articulated object 10 has the first point P1.

In particular, in the example of FIG. 4, there can be seen joint movement in rotation acting on a given joint 12a forming part of a chain of joints 12a, 12b, and 12c.

This movement in rotation of a joint, acting on a given joint 12a, can be determined by implementing the following steps.

A first vector $\vec{V1}$ is defined between the articulation center of said given joint 12a and the origin of the extraction vector $\vec{V}$. In this example, the origin of extraction vector $\vec{V}$ is the second point P2, but it would be the first point P1 when using a penetration depth mode.

Similarly, a second vector $\vec{V2}$ is defined between the articulation center of said given joint 12a and the end P1 of the extraction vector $\vec{V}$.

Thereafter, an angle of rotation $\vec{\theta}$ is calculated to cause the first vector $\vec{V1}$ to coincide with the second vector $\vec{V2}$. The angle of rotation $\vec{\theta}$ can be calculated by implementing a vector product between the first and second vectors $\vec{V1}$ and $\vec{V2}$ using the following formula:

$$\vec{\theta} = \frac{\vec{V1} \times \vec{V2}}{\vec{V1} \cdot \vec{V2}}$$

This angle of rotation $\vec{\theta}$ is resolved into one or more individual flexing angles $\theta_i$ about the axis or axes defining the degree or degrees of freedom corresponding to said given joint 12a of the articulated object 10.

In this example, the angle of rotation $\vec{\theta}$ is resolved into three individual joint-flexing angles $\theta_i$ about the axes $\vec{x}_a$, $\vec{y}_a$, $\vec{z}_a$.

The individual joint-flexing angle(s) $\theta_i$ may be calculated by means of one or more scalar products between the above-calculated vector products and the axis or axes of the degrees of freedom of the given joint 12a.

Finally, the articulated element at said given joint is turned through one or more angles $\alpha_i$ proportional to said individual joint angle(s) $\theta_i$.

The individual joint angles $\theta_i$ are normalized by the corresponding values of the displacement step size $\Delta a$ for the joint.

At said given joint 12a, the articulated embodiment is turned through one or more angles $\alpha_i$ given by the following formula:

$$\alpha_i = \sin^{-1}\frac{\vec{x}_i \cdot \vec{\theta}}{\Delta a}, i = a, b, c$$

Naturally, the same steps as above must be performed for all of the joints 12a, 12b, and 12c making up the chain of joints under consideration.

The use of a single extraction vector $\vec{V}$ calculated from a minimum distance or a penetration depth makes it possible to avoid collision between a given articulated element 11c and the other articulated elements 11 of the articulated object 10, thereby improving the precision of the movement of the articulated object 10 while optimizing the amount of calculation.

The present invention makes use of a single calculation of minimum distance or penetration depth in order to move a given articulated element 11c away from the other articulated elements 11 of the articulated object 10.

In addition, in order to avoid collision between each articulated element 11 and the remainder of the articulated object 10, the preceding steps of calculating an interaction distance, extracting first and second points, defining an extraction vector, and moving away the articulated element are repeated for each of the articulated elements 11 of the articulated object 10.

In particular, the given articulated element 11c may be selected from a given subset of articulated elements 11 making up the articulated object 10.

Certain articulated elements can be correlated with one another so that their relative movements are interdependent and so that they do not come into collision with one another. Under such circumstances, it suffices to select the given articulated element from amongst a subset comprising articulated elements that present movements that are independent from one another.

By way of example, for a dummy 10a, it is possible to assume that the legs are linked to each other and that only the arms can come into collision with one another or with the remainder of the dummy 10a.

Figure 5A:
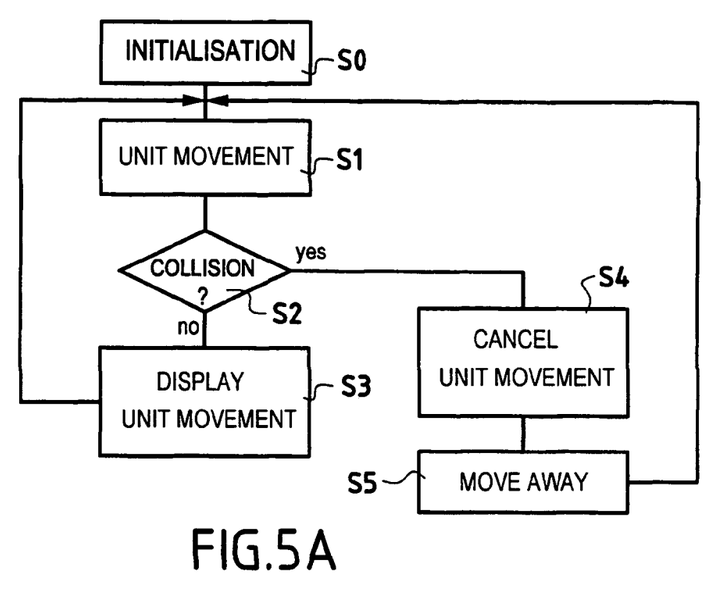
FIG. 5A is a flow chart showing the main steps in moving the articulated object of the invention.

FIG. 5A is a flow chart showing the main steps modeling the movement of the articulated object 10 while avoiding internal collisions between its articulated elements 11.

Step S0 is an initialization step in which various parameters are defined. For example, a counter for clocking pulses or calculation steps in the model is initialized.

Similarly, the unit movements or movement steps concerning position, orientation, and joints $\Delta a$ can also be defined in step S0. For example, steps of different sizes can be allocated depending on the natures of the joints 12. It is also possible to select an optimum constant step size for all of the joints 12 and for use throughout the movement of the articulated object 10.

In step S1, a unit movement of the articulated object 10 is calculated.

Step S2 is a test to determine whether or not there is collision between the given articulated element and one of the other articulated elements of the articulated object 10. The collision criterion depends on the value of the interaction distance.

In other words, for the mode based on minimum distance, it can be considered that a collision has occurred whenever this minimum distance is less than or equal to a minimum threshold distance, which can be equal to zero, so as to allow the articulated object 10 to move without collision between the given articulated element and the other articulated elements of the articulated object 10.

In contrast, in the mode based on penetration depth, it can be considered that a collision has occurred if said step becomes greater than or equal to a threshold penetration depth.

Thus, depending on how the threshold value is chosen, it is possible firstly to allow the articulated object 10 to move without internal collisions, or secondly to allow the articulated object 10 to move with limited and controlled amounts of collision between its articulated elements. This second circumstance makes it possible to model a certain amount of plasticity between the articulated elements when they come into contact with one another.

If there is no collision in accordance with the criterion of the preceding step S2, then in step S3, the movement of the articulated object 10 as calculated in step S1 is displayed, e.g. on the screen 7 of the computer 1, prior to returning to said step S1 in order to calculate the following unit movement.

Thus, in step S3, the steps of extracting the first and second points, of defining the extraction vector and of moving away the articulated element are not executed.

However, if there is a collision, then, in step S4, the unit movement calculated in step S1 is canceled.

Thereafter, in step S5, a movement is calculated that is defined as a function of the single extraction vector and that acts on the degrees of freedom of the articulated object in order to move the given articulated element away from the other articulated elements of the articulated object 10, prior to looping back to step S1.

Figure 5B:
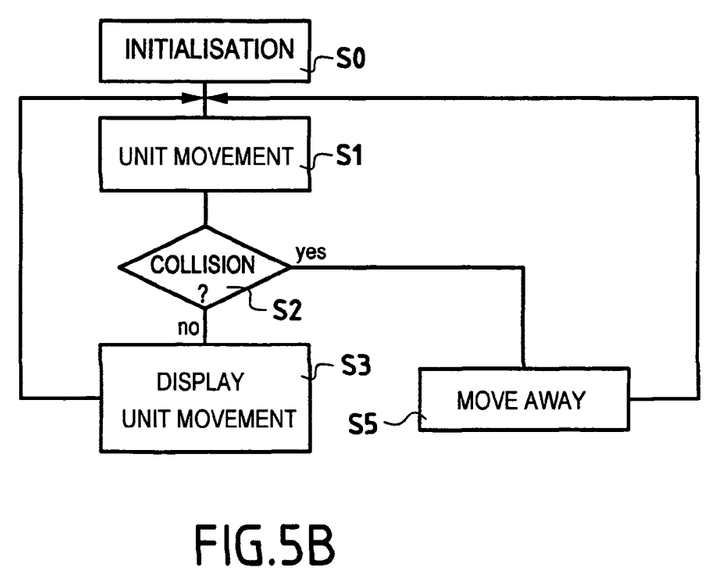
FIG. 5B shows a variant of FIG. 5A.

FIG. 5B shows a variant of FIG. 5A which is valid solely when the mode of calculation makes use of penetration depth.

The flow chart in this figure is the same as that in FIG. 5A, except that the step S4 no longer exists.

Thus, when there is a collision in step S2, the method moves on immediately to step S5 of moving the given articulated element away from the other articulated element of the articulated object, but without canceling the most recent unit movement, thus allowing a small amount of penetration between the given articulated element and the other articulated elements of the articulated object.

The virtual articulated object 10 can be moved in a virtual environment 13 by means of a "multi-agent" system or by any other known system.

Figure 6:
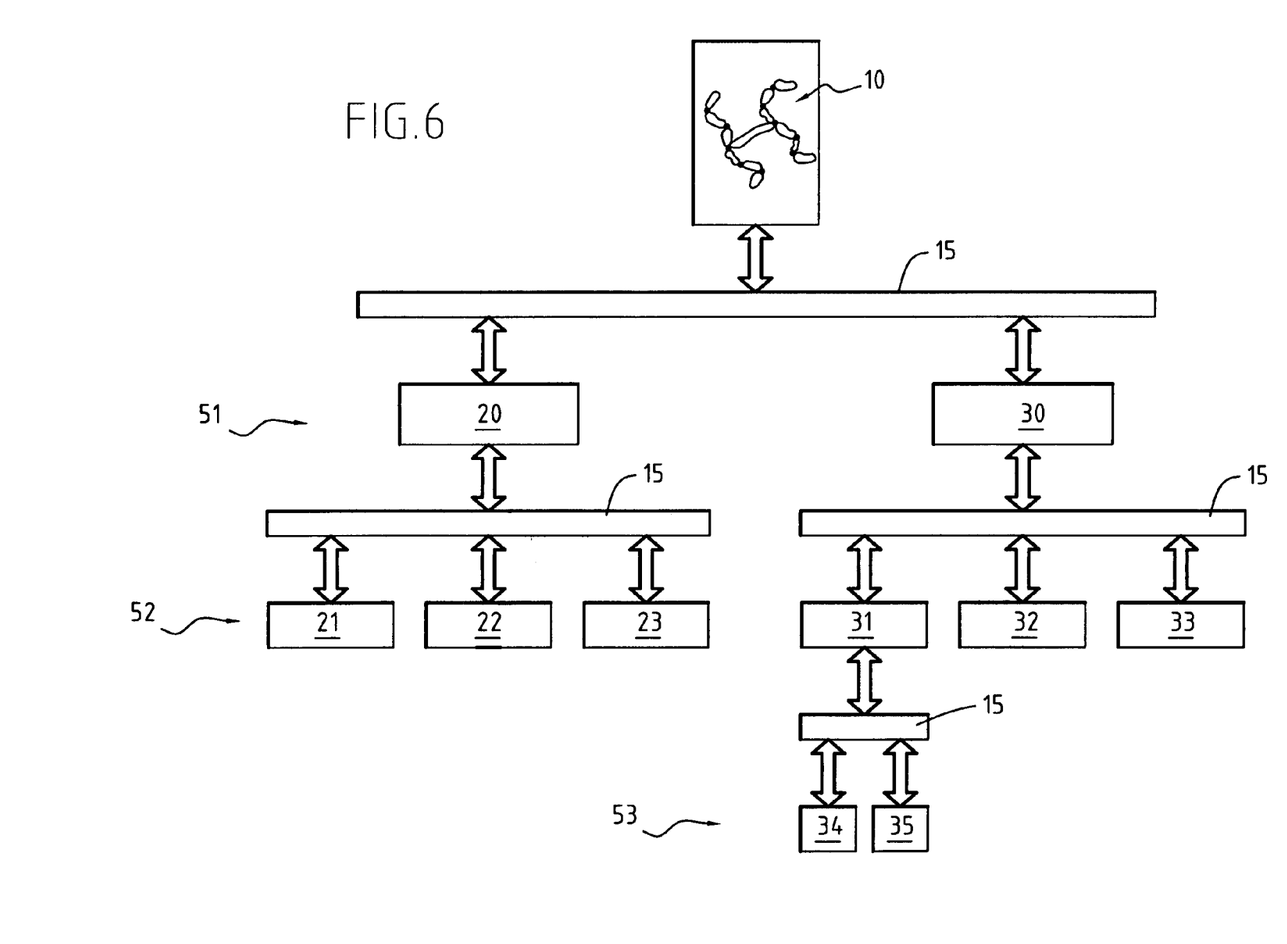
FIG. 6 shows very diagrammatically an architecture for a multi-agent system used for moving the articulated object in accordance with the invention.

FIG. 8 is highly diagrammatic and shows an architecture for a multi-agent system 50 which can be used for modeling the movement of an articulated object 10. This multi-agent system 50 is made up of a set of active elements or "agents" 20, 21, 22, 23, 30, 31, 32, 33, 34, and 35 which act on the passive objects (elements 11 and joints 12) making up the articulated object 10 as a function of its environment.

The data or variables defining the articulated object 10 and its environment constitute shared data 15 whereby the various agents interact.

The architecture of the multi-agent system can be organized as a plurality of stages or levels in pyramid manner so that the agents at the base contribute to the actions of agents that are on a higher level.

In this example, the multi-agent system 50 presents a first level 51, a second level 52, and a third level 53.

The first level 51 illustrates the action or the global contribution on the articulated object 10, and comprises the contribution of a first global agent 20 and the contribution of a second global agent 30 acting on the articulated object 10 by means of the shared data 15.

The first global agent 20 acts on the position and the orientation of the articulated object 10, while the second global agent 30 acts on the internal degrees of freedom of the joints 12 of the articulated object 10.

The second level 52 illustrates various contributions coming from different types of agent which give rise to the contributions of the first and second global agents 20 and 30, by interacting via the shared data 15.

Thus, the articulated object 10 can be moved by means of an attracter agent acting on the global position, and/or the global orientation, and/or the plurality of degrees of freedom of the articulated object.

Furthermore, the given articulated element can be moved away from the other articulated elements 11 of the articulated object 10 by means of an internal avoider agent acting on the plurality of degrees of freedom of the articulated object.

In addition, in known manner, the articulated object 10 can be moved away from its environment by means of an avoider agent acting on the global position, and/or the global orientation, and/or the plurality of degrees of freedom of the articulated object.

Thus, the second level 52 of the multi-agent system 50 may comprise a repulsive avoider agent 21 acting on the global position and/or orientation of the articulated object 10, an attracter agent 22 acting on the global position and/or orientation of the articulated object 10, a dynamic avoider agent 31 acting on the internal degrees of freedom of the joint 12 of the articulated object 10, and a dynamic attracter agent 32 acting on the internal degrees of freedom of the joint 12 of the articulated object 10.

The third level may comprise an internal avoider agent 34 and an obstacle avoider agent 35 which interacts via the shared data 15 to generate the contributions of the dynamic avoider agent 31.

The obstacle avoider agent 35 avoids collision between the articulated object and the environment by acting on the plurality of degrees of freedom of the articulated object 10.

The internal avoider agent 34 thus makes it possible to avoid collision or to ensure that no excessive penetration occurs between a given element and the other elements of the articulated object, by acting on the plurality of degrees of freedom of the articulated object 10.

In the minimum distance mode, and when in immediate proximity, non-collision is ensured by moving the given articulated element away from the other articulated elements of the articulated object after canceling the movement that gave rise to a collision.

In penetration depth mode, and in the event of a small amount of penetration, the given articulated element can be moved away from the other articulated elements of the articulated object without canceling the movement that gave rise to the small amount of penetration. This makes it possible to model plasticity of the outer skin of the articulated object. Thus, for a dummy, it is possible to model a degree of flexibility for the flesh of the dummy.

In addition, the articulated object 10 may be moved in real time by an operator by means of an operator agent acting on the position and/or the orientation and/or the plurality of degrees of freedom of the articulated object.

Thus, the second level 52 of the multi-agent system 50 can also include a global operator agent 23 acting on the global position and/or orientation of the articulated object 10, and an internal operator agent 33 acting on the internal degrees of freedom of the joints 12 of the articulated object 10.

What is claimed is:

1. A method of moving a virtual articulated object in a virtual environment in a succession of unit movements, the articulated object comprising a set of articulated elements connected together by a set of joints, the relative positions of the articulated elements being defined by a plurality of joint angles about a plurality of degrees of freedom, the method comprising the following steps:

calculating an interaction distance between a given articulated element and the other articulated elements of the articulated object;

extracting from said interaction distance, a first point belonging to the given articulated element, and a second point belonging to one of the other articulated elements of the articulated object;

defining a single extraction vector from said first and second points; and moving the given articulated element away from the other articulated elements of the articulated object in a movement defined as a function of the single extraction vector by acting on the degrees of freedom of the articulated object in order to avoid a collision between the given articulated element and the other elements of the articulated object, wherein said steps of calculating an interaction distance, extracting the first and second points, defining the extraction vector, and moving away the given articulated element, are repeated for each of the articulated elements of the articulated object in order to avoid collision between each articulated element and the remainder of the articulated object.

2. A method according to claim 1, wherein the interaction distance corresponds to a penetration depth, such that the extraction vector is equal to the coordinates of the second point minus the coordinates of the first point, the penetration depth enabling the articulated object to move with a limited and controlled amount of collision between its articulated elements.

3. A method according to claim 1, wherein the interaction distance corresponds to a minimum distance, such that the extraction vector is equal to the coordinates of the first point minus the coordinates of the second point, the minimum distance enabling the articulated object to move without collision between its articulated elements.

4. A method according to claim 1, further comprising a step of canceling the most recent unit movement in said succession of unit movements in the event of a collision occurring between the given articulated element and the other articulated elements of the articulated object.

5. A method according to claim 1, wherein said steps of extracting the first and second points, of defining the extraction vector, and of moving away the given articulated element, are not executed so long as a collision does not occur between the given articulated element and the other articulated elements of the articulated object.

6. A method according to claim 1, wherein the given articulated element is moved away from the other articulated elements of the articulated object by joint-flexing movement acting on each of the joints belonging to a chain of joints preceding the given articulated element, with the joint-flexing movement acting at any given joint in said chain of joints comprising the following steps:

defining a first vector between the articulation center of said given joint and the origin of the extraction vector;

defining a second vector between the articulation center of said given joint and the end of the extraction vector;

calculating an angle of rotation for causing the first vector to coincide with the second vector;

calculating one or more individual joint-flexing angles by resolving said angle of rotation on the axis or axes defining the degree or degrees of freedom corresponding to said given joint; and turning the articulated element about said given joint through one or more angles proportional to said individual joint angle(s).

7. A method according to claim 6, wherein the angle of rotation is calculated by means of a vector product between the first and second vectors.

8. A method according to claim 6, wherein the individual joint angle(s) is/are calculated by means of one or more scalar products between the vector product and the axis or axes of the degree(s) of freedom of the given joint.

9. A method according to claim 1, wherein the articulated element is moved away from the other articulated elements of the articulated object by means of an internal avoider agent acting on the plurality of degrees of freedom of the articulated object.

10. A method according to claim 1, wherein the articulated object is specified in its virtual environment by a global position, and a global orientation, such that the articulated object is moved by means of an attractor agent acting on a global position, and/or a global orientation, and/or the plurality of degrees of freedom of the articulated object.

11. A method according to claim 1, wherein the method further comprises a step of an operator moving the articulated object in real time by means of an operator agent acting on the position and/or the orientation and/or the plurality of degrees of freedom of the articulated object.

12. A method according to claim 1, wherein the articulated object is a virtual dummy moving on a floor of a virtual environment, the dummy being defined by a position on the virtual floor, by an orientation about a vertical axis perpendicular to said floor and passing through the center of gravity of the dummy, and by the plurality of joint angles defining the set of articulated elements.

13. A computer program, the program being designed to implement the method according to claim 1 when executed by a computer.

14. A method of moving a virtual articulated object in a virtual environment in a succession of unit movements, the articulated object comprising a set of articulated elements connected together by a set of joints, the relative positions of the articulated elements being defined by a plurality of joint angles about a plurality of degrees of freedom, the method comprising the following steps:

calculating an interaction distance between a given articulated element and the other articulated elements of the articulated object;

extracting from said interaction distance, a first point belonging to the given articulated element, and a second point belonging to one of the other articulated elements of the articulated object;

defining a single extraction vector from said first and second points;

moving the given articulated element away from the other articulated elements of the articulated object in a movement defined as a function of the single extraction vector by acting on the degrees of freedom of the articulated object in order to avoid a collision between the given articulated element and the other elements of the articulated object, and after each unit movement in said succession of unit movements, determining whether a collision has occurred between the given articulated element and the other articulated elements of the articulated object.

15. A method of moving a virtual articulated object in a virtual environment in a succession of unit movements, the articulated object comprising a set of articulated elements connected together by a set of joints, the relative positions of the articulated elements being defined by a plurality of joint angles about a plurality of degrees of freedom, the method comprising the following steps:

calculating an interaction distance between a given articulated element and the other articulated elements of the articulated object;

extracting from said interaction distance, a first point belonging to the given articulated element, and a second point belonging to one of the other articulated elements of the articulated object;

defining a single extraction vector from said first and second points; and moving the given articulated element away from the other articulated elements of the articulated object in a movement defined as a function of the single extraction vector by acting on the degrees of freedom of the articulated object in order to avoid a collision between the given articulated element and the other elements of the articulated object.

16. A method according to claim 15, wherein the interaction distance corresponds to a penetration depth, such that the extraction vector is equal to the coordinates of the second point minus the coordinates of the first point, the penetration depth enabling the articulated object to move with a limited and controlled amount of collision between its articulated elements.

17. A method according to claim 15, wherein the interaction distance corresponds to a minimum distance, such that the extraction vector is equal to the coordinates of the first point minus the coordinates of the second point, the minimum distance enabling the articulated object to move without collision between its articulated elements.

18. A method according to claim 15, further comprising a step of canceling the most recent unit movement in said succession of unit movements in the event of a collision occurring between the given articulated element and the other articulated elements of the articulated object.

19. A method according to claim 15, wherein said steps of extracting the first and second points, of defining the extraction vector, and of moving away the given articulated element, are not executed so long as a collision does not occur between the given articulated element and the other articulated elements of the articulated object.

* * * * *